United States Patent [19]

Tagiri

[11] Patent Number: 5,373,498
[45] Date of Patent: Dec. 13, 1994

[54] DISC-SHAPED RECORD MEDIUM

[75] Inventor: Takao Tagiri, Yamanashi, Japan

[73] Assignees: Pioneer Electronic Corporation, Tokyo; Pioneer Video Corporation, Yamanashi, both of Japan

[21] Appl. No.: 50,572

[22] Filed: Apr. 21, 1993

[30] Foreign Application Priority Data

Apr. 27, 1992 [JP] Japan .................. 4-107660

[51] Int. Cl.$^5$ .............................................. G11B 20/12
[52] U.S. Cl. ................................ 369/275.3; 369/275.1
[58] Field of Search ................. 369/275.3, 275.4, 275.1

[56] References Cited

U.S. PATENT DOCUMENTS 5,239,533  8/1993  Yoshimaru et al. ............... 369/275.4
5,270,991  12/1993  Verboom ............................ 369/44.26

Primary Examiner—Paul M. Dzierzynski
Assistant Examiner—Don Wong
Attorney, Agent, or Firm—Sughrue, Mion, Zinn, Macpeak & Seas

[57] ABSTRACT

A disc-shaped record medium provided with an information recording area including tracks for recording information therein, which information recording area is divided into a plurality of circular recording areas in the radial direction thereof. Each of the circular recording areas includes at least a first block wherein individual track pitches are gradually reduced in accordance with the radial distance from the center portion of the record medium. Also, a second block may be provided following the first block, in which track pitches are gradually increased in proportion to the radial distance from the center portion of the record medium. With the disc-shaped record medium constructed as such, not only can the recording capacity thereof as a whole be increased, but smooth shifting of the head for an information recording or reproducing operation is also obtained.

2 Claims, 4 Drawing Sheets

DISC-SHAPED RECORD MEDIUM

BACKGROUND OF THE INVENTION

1. Field of the Invention

The present invention relates to a disc-shaped record medium wherein information signals are recorded in the information recording areas thereof formed of tracks which are of concentrical or spiral shape.

2. Description of the Prior Art

Hitherto, various recording formats for information recording operation have been conventionally proposed, a case in point being the one called a CAV (Constant Angular Velocity) mode which is a method for keeping constant the revolution frequency of a spindle and frequency for recording or reproducing information on or from a record medium.

However, there is a defect in the record medium in which information is recorded in the above CAV mode such that the information recording capacity thereof as a whole is reduced since the recording density gets reduced in proportion to the distance from the center portion of the record medium, and in order to eliminate this problem, there has been provided a ZCAV (Zone Constant Angular Velocity) mode by which recording capacity of the record medium as a whole can be increased taking advantage of an easy revolution control of the CAV mode. In other words, the ZCAV mode is a method in which a revolution frequency of the spindle is kept constant during the whole recording or reproducing operation, whereas the frequency for recording or reproducing information on or from the record medium is increased step by step in proportion to the distance from the center of the record medium. By the way, although it is common to set a track pitch (a distance between two adjacent tracks) normally to 1.5 to 1.6 μm, there has also been proposed an improved CAV mode in which information recording capacity of the record medium is increased by making the track pitches narrower in proportion to the distance from the center of the record medium.

It is already known that the recording capacity of the record medium in the above explained ZCAV mode can be further increased by making the track pitches within a record medium variable. However in recent years, it is still required in the modern society to provide a method by which a large quantity of various information can be recorded or reproduced on or from a record medium of a smaller size so as to further increase the recording density thereof.

SUMMARY OF THE PRESENT INVENTION

The present invention has been made to meet the requirement as described above, and it is an object of the present invention to provide a disc-shaped record medium which is capable of maintaining reliability in recording and/or reproducing information, and yet increasing the information recording capacity thereof.

A disc-shaped record medium according to the present invention is constructed such that the information recording area is divided into a plurality of circular recording areas in the radial direction thereof, wherein the information recording capacity per track is increased in proportion to the distance from the center of the record medium, that is, there is provided more recording capacity in the outer circle than in the inner circle and that there is formed a block in each of the circular recording areas wherein individual track pitches are gradually reduced in proportion to the radial distance from the center of the record medium. A disk-shaped record medium according to the present invention is also constructed such that in each of the circular recording areas excluding the outmost recording zone thereof, in addition to the block in which track pitches are gradually narrowed, there is also provided another block in which track pitches are gradually increased after the above block.

A disc-shaped record medium according to the present invention is characterized in that there are formed blocks in each of the circular recording areas wherein in one block the track pitches are gradually narrowed, whereas in another block following this the track pitches are gradually increased, and subsequently the head for recording and reproducing information can be smoothly shifted and recording density can be increased.

Other objects and features of the invention will be more fully understood from the following detailed description and appended claims when taken in conjunction with the accompanying drawings.

Figure 1:
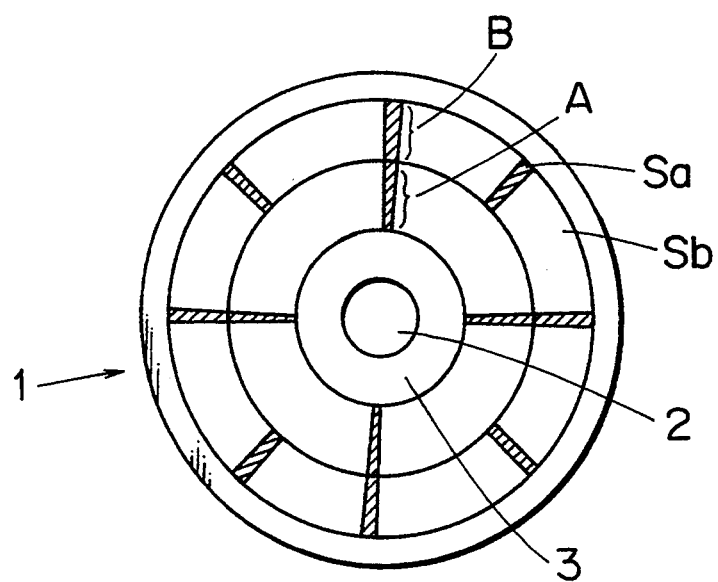
FIG. 1 is an explanatory view of a disc-shaped record medium showing an embodiment of the present invention.

In the figures, reference characters A and B respectively denote recording area; Sa denotes a header signal recording area and Sb denotes a information recording area; wherein reference numeral 1 denotes a record medium; 2 denotes a center hole thereof, 3 a clamping area; 10, a glass plate; 11 a motor; 12 a turn table; 13 a motor encoder; 14 a phase comparator; 15 a reference oscillator; 16 and 17 each denotes a frequency divider; 18 a movable optical system; 20 a laser source; 21 a laser beam modulator; 22 a recording signal generator; 23 and 24 a mirror; 25 an objective lens; 26 a location shifting motor; 27 a location shifting table; 28 a location shifting reference speed signal generator and 29 denotes a linear scaler.

DETAILED DESCRIPTION OF THE PREFERRED EMBODIMENTS

In the following, several embodiments of the present invention are described with reference to the accompanying drawings.

Referring to FIG. 1, there is shown a plan view illustrating a disc-shaped record medium of a sector-servo mode. The sector-servo mode is a method in which one track round on the recording surface is uniformly divided into small areas called sectors, wherein each of the sectors comprises a header signal recording area for recording control information such as address information in the first portion thereof, and information recording area following thereto for recording necessary information.

In the figure, reference numeral 1 denotes a round disk as a record medium, numeral 2 denotes a center hole of the record medium 1 and 3 denotes a clamping area. The recording surface of the record medium is divided into circular recording areas A and B in the radial direction of the record medium, wherein four sectors are provided in the inner side recording area A, while eight sectors are provided in the outer side recording area B, and each sector comprises a header signal recording area Sa at the beginning portion thereof, and information recording area Sb after the header signal recording area Sa.

Figure 2A:
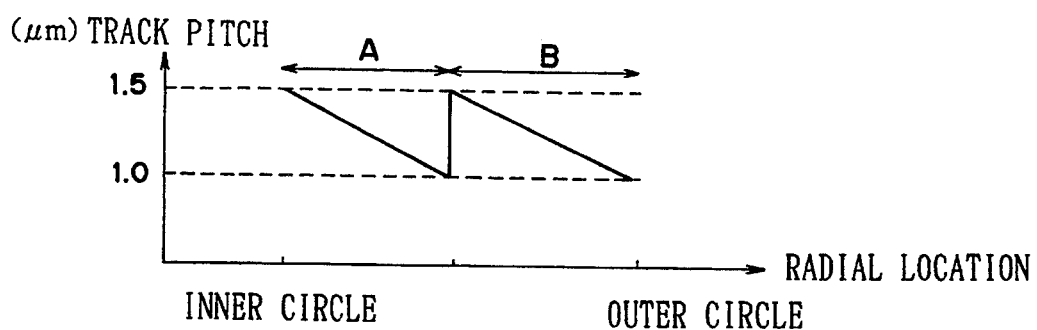
FIGS. 2A, 2B and 2C are illustrations respectively showing a first, second and third embodiments, wherein each represents the relationship between the track pitch and the radial location with respect to the disc-shaped record medium of FIG. 1.
Figure 2B:
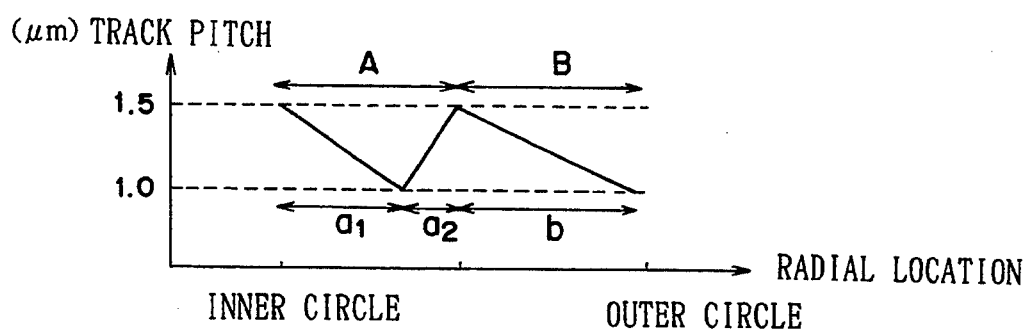
Figure 2C:
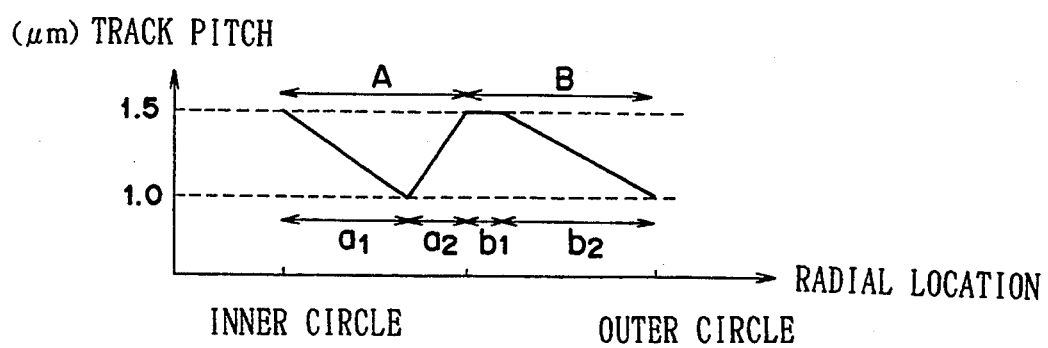
Figure 3:
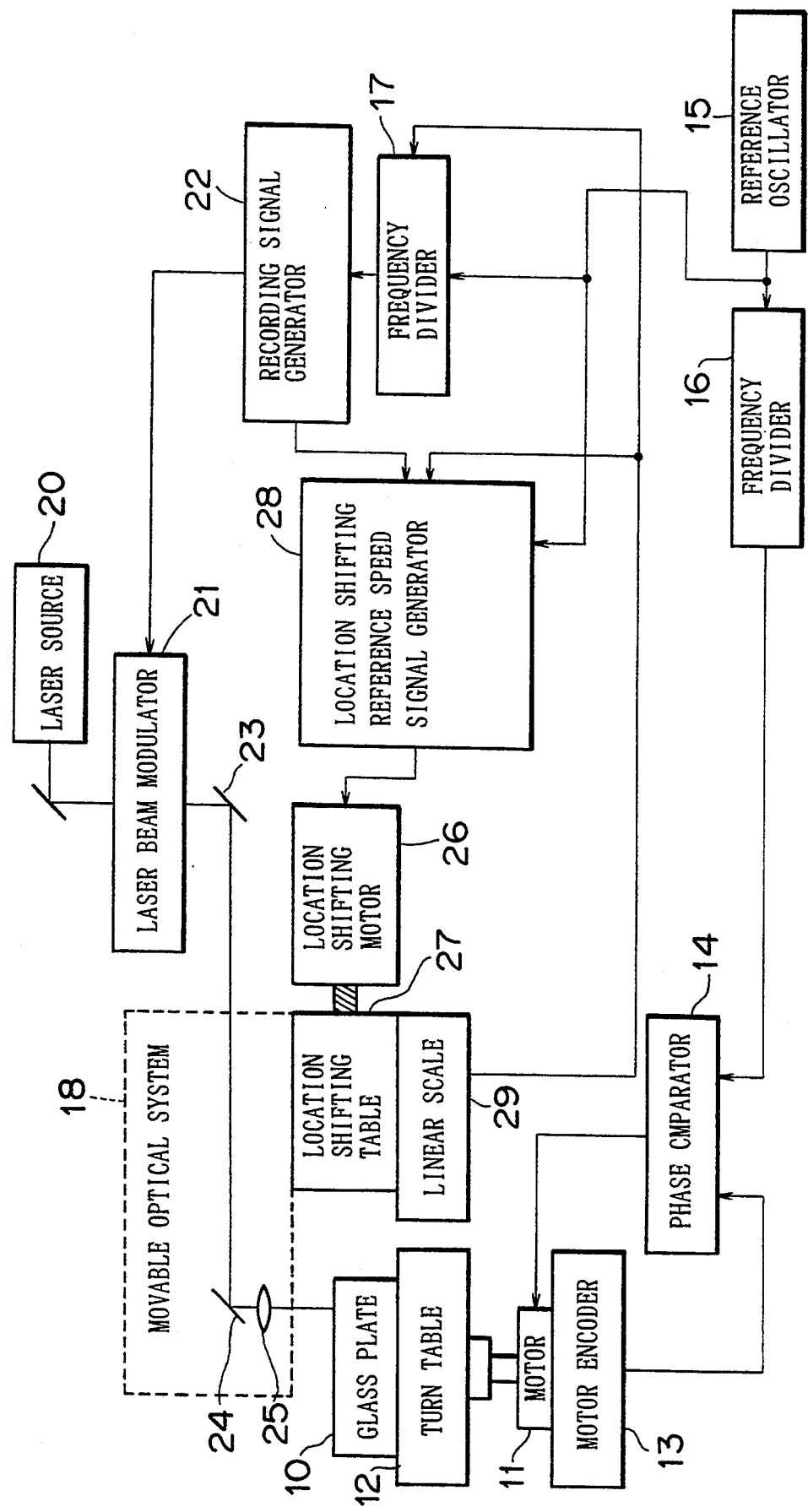
FIG. 3 is a diagram showing a cutting device for manufacturing the disc-shaped record medium.

Referring to FIGS. 2A, 2B and 2C, there are shown respectively relationships between the location in the radial direction and track pitches in the record medium as shown in FIG. 1. In FIG. 2A, the track pitches of the respective circular recording areas A and B are constructed such that they get smaller in proportion to the radial distance from the inner side to the outer side. The track pitch of the innermost side of the recording area A is 1.5 μm, and then gets narrower as it goes toward outer side and the outermost side is formed 1.0 μm. The same arrangement can be applied to the size of the track pitches in the recording area B.

In this embodiment as constructed above in which track pitches are formed in the circular recording area as shown in FIG. 2A, recording density can be increased more than the conventional disc-shaped record medium. However, there is still a problem in this embodiment that due to the fact that the size of the track pitches are abruptly changed from 1.0 μm to 1.5 μm when shifting from recording area A to B, and subsequently a stability in shifting the head for information recording or reproducing operation can be impaired.

In order to eliminate this problem, several tracks can be made as a buffer area which is not used for information recording operation, but information recording capacity is definitely reduced by doing so as a matter of fact, and thus the problem still remains. The embodiments respectively shown in FIGS. 2B and 2C are the methods for solving the above defects.

In the embodiment shown in FIG. 2B, it is arranged such that the head is smoothly shifted for the information recording area A to the area B. In the recording area A, there are formed two blocks a1 and a2, wherein the track pitch at the innermost side of the block a1 is 1.5 μm, and it gets gradually narrower along the radial distance toward the outer side thereof to finally become 1.0 μm, whereas in the block a2, it gradually gets wider again and finally recovers to 1.5 μm. In the recording area B following the block a2 of the recording area A, there is formed a block b1 wherein the track pitch at the innermost side thereof is 1.5 μm, which gets narrower as it goes toward the outer side thereof to finally become 1.0 μm. Due to the existence of the block a2 formed in the recording area A, the track pitch is not abruptly changed between the recording areas A and B.

Referring to FIG. 2C, there is shown another embodiment of the present invention in which apart from the above arrangement that the recording area A is divided into two blocks a1 and a2 wherein the track pitches become gradually narrower and gradually widened respectively, there is also formed a block b1 in the information recording area B following the block a2 of the recording area A, within which the track pitch is uniformly set to the 1.5 μm, and then a block b2 following the block b1 is formed in such a mode that the track pitch gradually becomes narrower. By this structure, a smooth shifting of the head for information recording or reproducing operation can be further stabilized.

In the following, a disk surface cutting device for manufacturing the disc-shaped record medium according to the present invention is explained in reference to FIGS. 3A 3B, 3C and FIG. 4 for a better understanding of the structure of the record medium itself.

A glass plate 10 coated with a photo-resist layer is mounted on a turn-table 12 which is activated by a motor 11, and a motor encoder 13 for generating a signal in accordance with the rotation of the motor 11 is attached thereto. A reference speed signal which is obtained by frequency dividing a signal fed from a reference oscillator 15 at a frequency divider 16 is fed to a phase comparator 14 so as to be compared with the signal fed from the encoder 13 in order to generate a control signal representing the phase shift therebetween, and thereafter, the thus generated control signal is fed to the motor 11 for settling the rotation frequency thereof constant.

Information recording operation to the glass plate 10 is conducted by radiating laser beam onto the photo-resist layer coated thereon. First of all, the laser beam such as argon laser generated by a laser source 20 is radiated to a laser beam modulator 21 such as AOM (Acoustic Optical Modulator), and thereafter the thus radiated laser beam is modulated by a header signal which is also fed to the laser beam modulator 21. The header signal is generated such that the output signal from the reference oscillator 15 is frequency divided at a frequency divider 17, and the thus generated clock signal is fed to the recording signal generator 22. The header signal generated through such a procedure is fed to the laser beam modulator 21 at a predetermined transmission rate on the basis of the clock signal. It is to be noted that the frequency of the clock signal is settled such that the further as it goes in the radial direction on the record medium, the higher it becomes by varying step by step the frequency division ratio of the frequency divider 17 in accordance with the radial location (location in the radial direction) obtained by the radial location information which is explained afterwards.

In the following, an embodiment according to the present invention is explained in reference to FIG. 1 wherein a disc-shaped information record medium is divided into two circular recording areas.

The clock frequency fed from the frequency divider 17 is set to f in the radial location corresponding to the information recording area A, whereas the clock frequency is set to 2f in the radial location corresponding to the information recording area B, so that information recording density of the area B per one track is twice as high as that of the recording area A, which means that the number of sectors in the recording area B is twice as many as that of the recording area A. On the other hand, the laser beam modulator 21 modulates the light strength level of the laser beam in accordance with the header signal. The laser beam modulated by the laser beam modulator 21 is then led to an objective lens 25 by way of mirrors 23 and 24 and converged thereby so as to expose the photo-resist layer of the rotating glass plate 10.

The modulated laser beam radiated to the glass plate 10 gradually shifts its radiating location from the inner circle to the outer circle in the radial direction of the disc-shaped record medium by shifting a movable optical system 18 comprising mirrors 23, 24 and the objective lens 25 disposed on a location shifting table 27 in accordance with the rotation of a location shifting motor 26, whereby spiral-shaped recorded tracks are formed on the photo-resist surface of the glass plate 10 at a predetermined pitch.

A location shifting reference speed signal provided to the location shifting motor 26 is fed by frequency dividing an output signal from the reference oscillator 15 and through a reference signal generator 28.

Figure 4A:
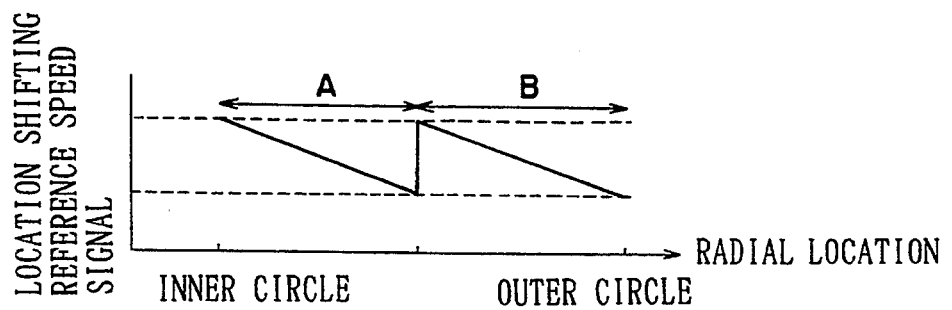
FIGS. 4A, 4B and 4C are illustrations respectively showing a location shifting reference speed signal fed to a motor.
Figure 4B:
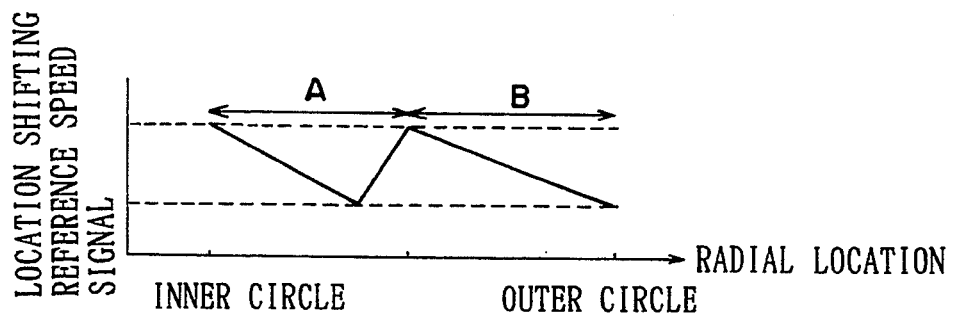
Figure 4C:
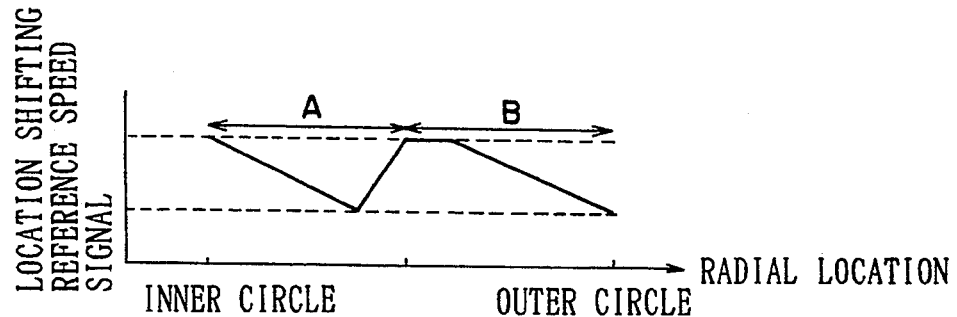

The track pitches as shown by the embodiments respectively disclosed in FIGS. 2A, 2B and 2C are formed by generating a location shifting reference speed signal corresponding to the radial location as shown in respective FIGS. 4A, 4B and 4C, wherein the location shifting reference speed signal is generated based on the address signal within the header signal fed from the recording signal generator 22 and a signal obtained by frequency dividing the signal fed from the reference oscillator 15 in accordance with the information regarding the radial location generated from a radial location information generator such as a linear scaler 29 attached to the location shifting table 27.

By the way, it should be noted that when producing information recording tracks, as well as reproducing the information therefrom by controlling the location shifting motor 26 in accordance with a reference speed signal, there is caused an inconsistency in the track pitches due to an abrupt change in the location shifting reference speed signal in forming the recording area A. However, if the reference speed signal is arranged as shown in FIGS. 4B and 4C, the laser beam radiated by the movable optical system 18 is smoothly shifted by the location shifting motor 26, so that the above inconsistency in the track pitches can be avoided.

The photo-resist layer of the glass plate 10 formed with the tracks having above variable track pitches is then developed, and electrically molded to produce a stamper from which a base disk plate is reproduced. Thereafter, the surface of the base disk plate is formed with a recording layer composed of an optical beam absorptive substance, so that a recordable optical disk having a predetermined sector format and track pitches can be obtained.

Recording and/or reproducing operation of information on/from the optical disk as produced above is conducted in such a mode that either while the rotation frequency is made constant and the data transmission clock frequency is made higher in the inner recording side than in the outer recording side, or while data transmission clock frequency is made constant, the rotation frequency of the disk is made lower in the outer side than in the inner side in a gradual manner.

It should be noted that although in the above embodiments track pitches are increased or decreased in a rectilinear mode in accordance with the radial location thereof, they can also be arranged in a non-rectilinear mode as a matter of fact.

Effect of the Invention

As explained above, a disc-shaped record medium is constructed such that a plurality of divided circular information recording areas are formed along the axis in the radial direction, wherein recording capacity per track in each of the circular information recording area is increased as it goes toward the outer circular recording areas, and that information recording density is effectively increased by varying the track pitches in each of the circular recording areas.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A disc-shaped record medium provided with an information recording area including tracks for recording information therein, said information recording area being divided into a plurality of circular recording areas along a radial axis of said record medium, wherein a recording capacity per track in each of said circular recording areas is different such that it increases toward an outer circular recording area along said radial axis, and wherein each of said circular recording areas comprises at least a first block wherein individual track pitches are gradually reduced from a first predetermined value to a second predetermined value in accordance with a radial distance from a center portion of said record medium, and wherein each of said circular recording areas except an outermost one further comprises a second block following said first block, in which track pitches are gradually increased from said second predetermined value to said first predetermined value in accordance with the radial distance from the center portion of said record medium.

2. A disc-shaped record medium as claimed in claim 1, wherein each of said circular recording areas except the innermost one comprises a third block formed adjacent to, and starting from the second block of the foregoing recording area, wherein in said third block individual track pitches are made constant with the track pitches formed in said second block of the foregoing recording area and followed by the first block formed in the same recording area.

* * * * *